May 15, 1951
D. D. LOWBER ET AL
2,553,099
PANTOGRAPHIC SIGHTING APPARATUS FOR FORMING MACHINES
Filed March 30, 1946
3 Sheets-Sheet 1
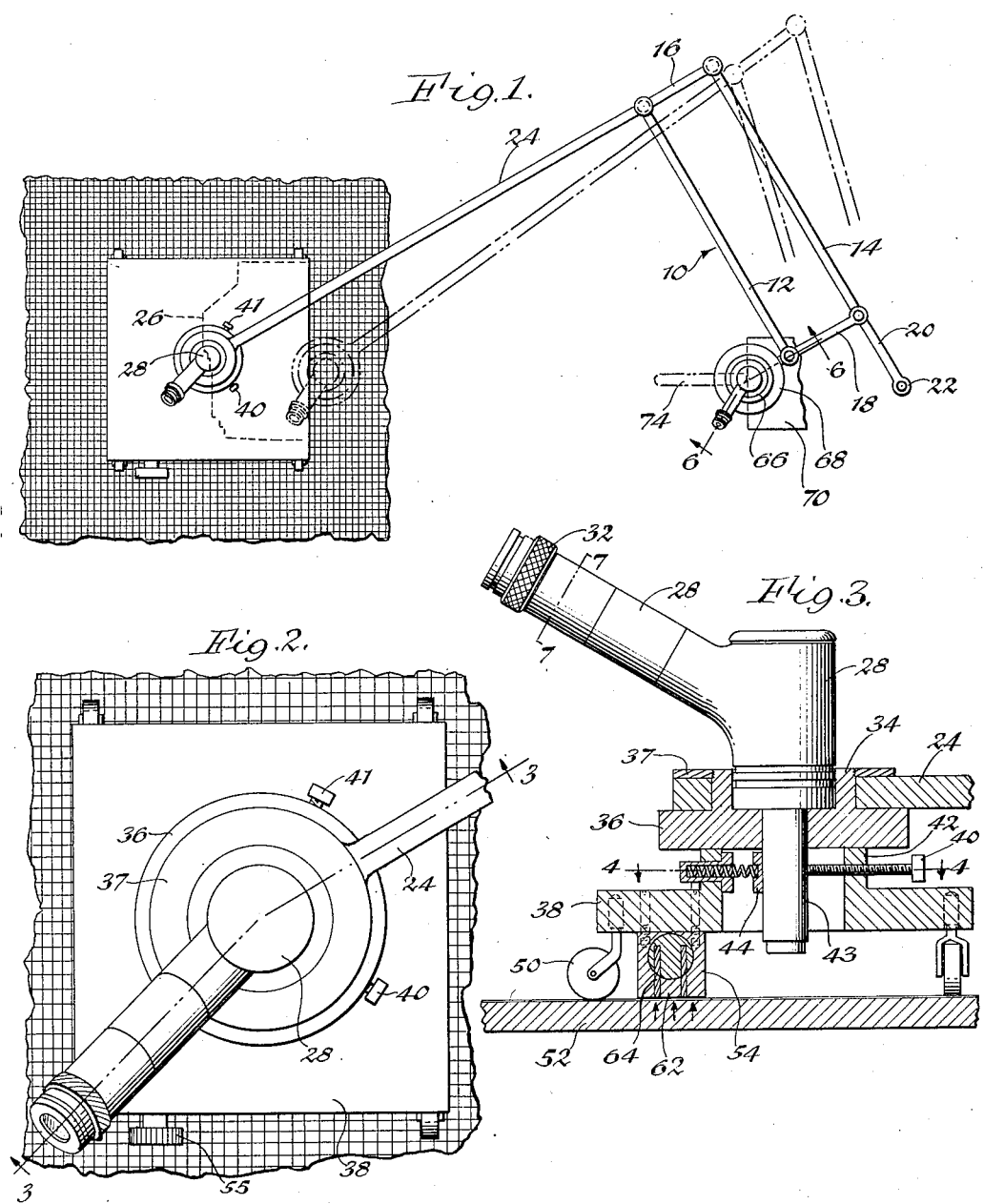
*INVENTORS*
GUSTAV E. GUELLICH
DAVID D. LOWBER
BY
*ATTORNEY*

May 15, 1951 D. D. LOWBER ET AL 2,553,099
PANTOGRAPHIC SIGHTING APPARATUS
FOR FORMING MACHINES
Filed March 30, 1946 3 Sheets-Sheet 2
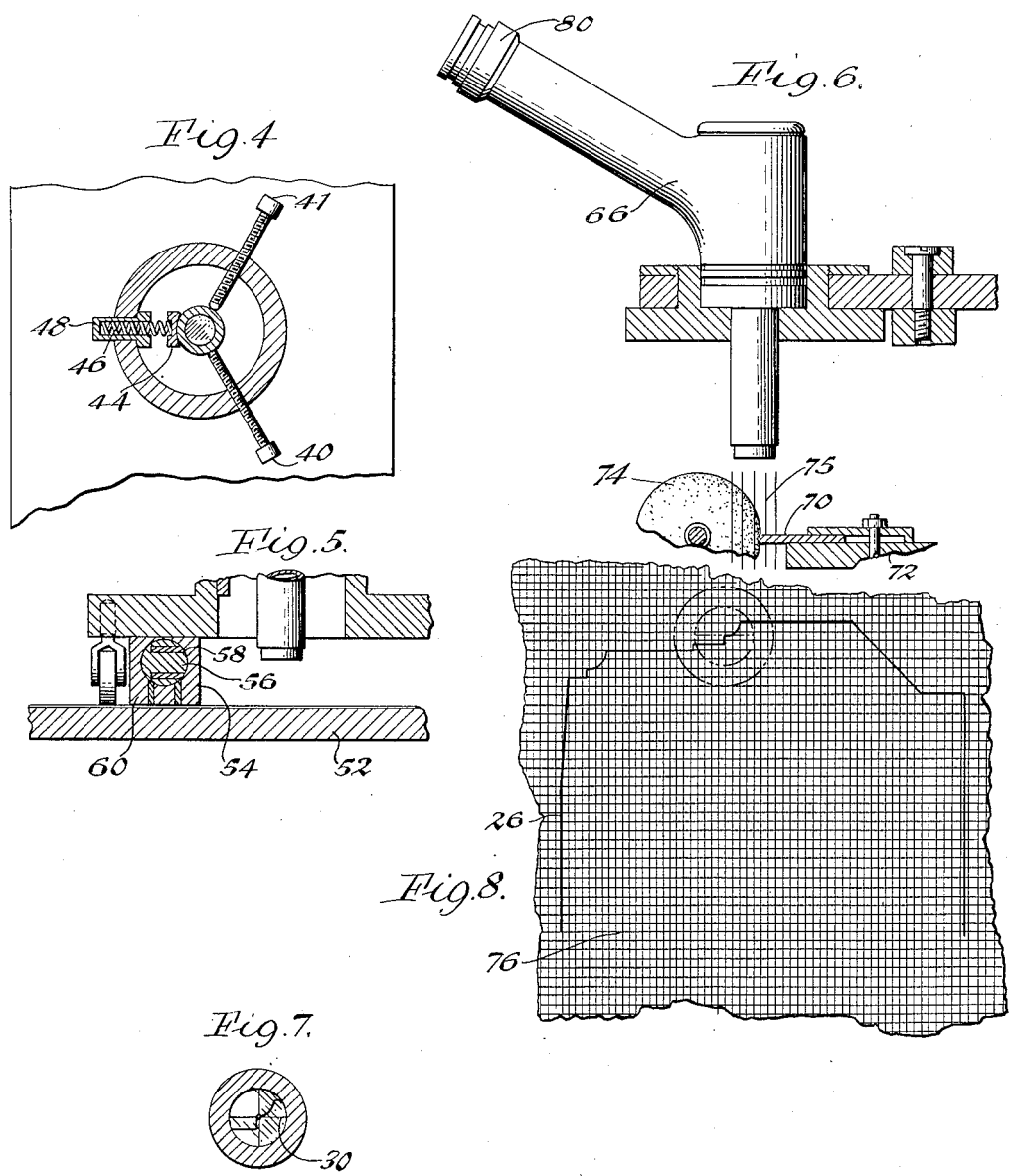
INVENTORS
GUSTAV E. GUELLICH
BY DAVID D. LOWBER
ATTORNEY

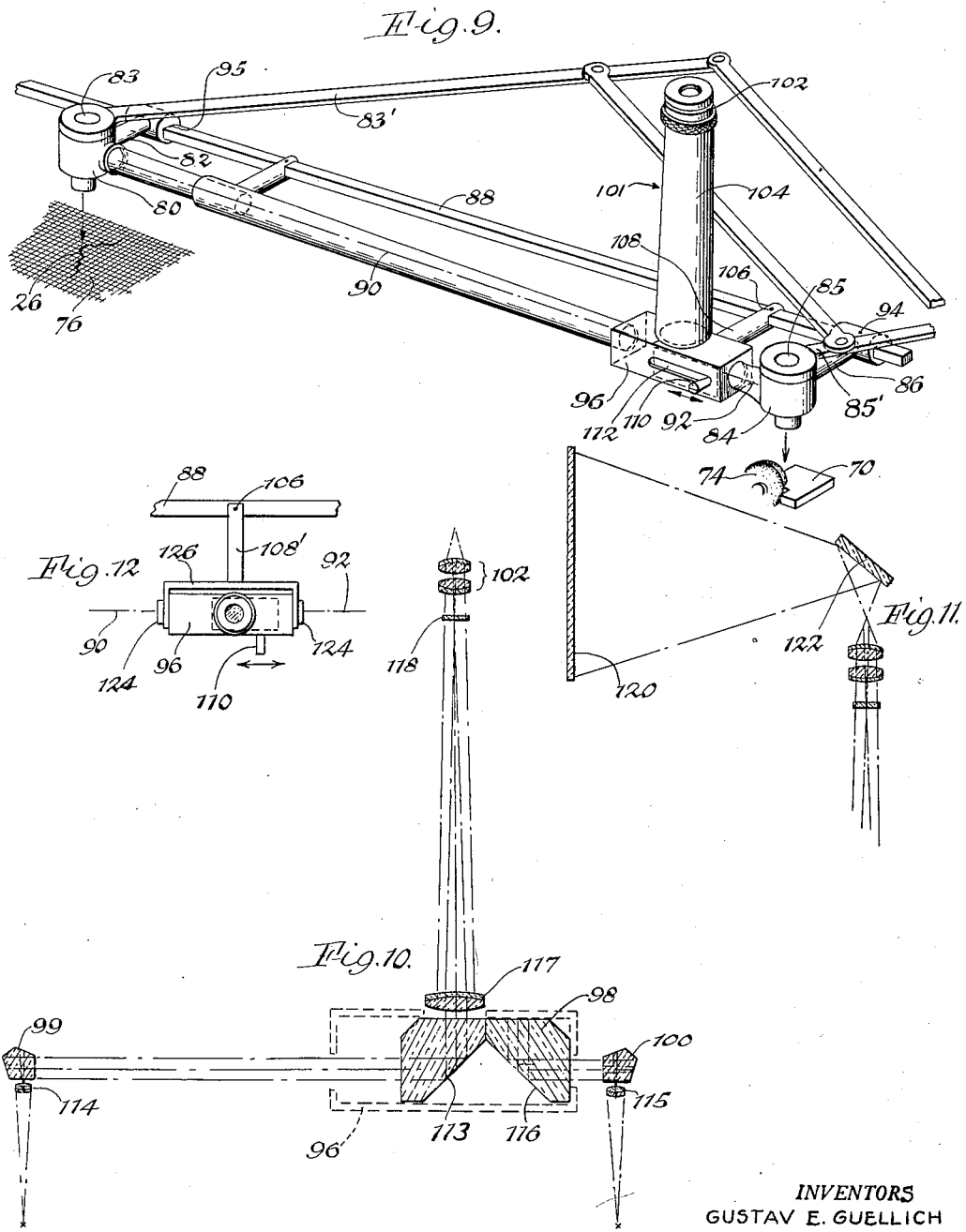

UNITED STATES PATENT OFFICE 2,553,099

PANTOGRAPHIC SIGHTING APPARATUS FOR FORMING MACHINES

David D. Lowber, Snyder, and Gustav E. Guellich, Buffalo, N. Y., assignors to American Optical Company, Southbridge, Mass., a voluntary association of Massachusetts Application March 30, 1946, Serial No. 658,458

13 Claims. (Cl. 33—46)

This invention relates to profile forming machines and more particularly to new and improved optical devices for use with such machines for forming profiles in an accurate and readily controlled manner upon workpieces in said machines.

Profile forming machines have heretofore been employed for forming precision gauges, templets, tools and the like, such as the profile grinding machine shown by the Wohlfarth Patent No. 2,164,169; but the optical devices used with such machines have not been entirely satisfactory since the desired accuracy in forming workpieces was not readily accomplished thereby. For example, in said Wohlfarth patent, photoelectric means was provided on a pantograph arm for tracing an enlarged pattern and indicating by signal when this means and arm deviated from the pattern. Some deviation, however, inherently occurred in such device before the signal means operated and thus, accordingly, the high degree of accuracy desired was not accomplished.

In the present invention, applicants have provided an optical device for use with profile forming mechanisms comprising a pantograph having a pair of supporting arms and on the arm thereof intended for tracing the pattern is positioned an optical system in the form of a microscope including a reticule or cross hairs whereby an enlarged pattern may be accurately viewed and aligned with said reticule or cross hairs. The other arm of said pantograph is provided with a second optical system including a microscope arranged to overlie the workpiece and forming tool on the machine and this optical system is likewise provided with a reticule or cross hairs to indicate upon the workpiece the exact positions to which the forming tool is to be successively moved for forming the profile desired.

In order that best results may be accomplished by applicants' pattern tracing device, the optical system and its supporting arm are supported upon a carriage provided with anti-friction means so that said optical system, arm and carriage may be easily and accurately moved as desired across the pattern and the supporting surface for same. The carriage is provided with readily operable brake means for preventing undesired movement of the carriage during use of the device. To function therewith the carriage is provided with suitable adjusting means engageable with parts of the optical system carried thereby so that said optical system may be moved by small increments in any direction desired parallel to said supporting surface while said brake mechanism maintains the carriage in fixed position relative to said pattern and supporting surface.

To effect a more accurate and rapid method of profile forming, applicants provide a coordinate system or graph which may be used in conjunction with the pattern to indicate small increments or distances along the pattern through which said first optical system is to be successively moved to successively and proportionally move the second optical system so that the forming or grinding tool in the field of said second optical system may be moved by small increments into alignment with the reticule thereof for accurately forming the profile on the workpiece.

Additional means in the form of an interconnecting or coordinating mechanism is provided for interconecting the two optical systems upon the profile forming machine so that the pattern and the workpiece being profiled may be selectively viewed through an image forming means or device associated therewith from a single position. Said coordinating mechanism is also provided with means whereby said image forming device may be rotated about an optical axis extending between said optical systems for conveniently changing the position of said image forming device so that various positions thereof convenient to the operator of the machine may be available.

It is, accordingly, an object of this invention to provide means for accurately viewing successive spaced portions of a pattern and simultaneously positioning an optical system having a reticule or the like in alignment with a workpiece so that a forming tool may be successively moved to exact positions over said workpiece to thereby accurately indicate a predetermined profile thereon and allow an operator of the machine to move a forming tool to form such profile.

It is also an object of this invention to provide suitable means in the form of a movable carriage for facilitating the accurate positioning of an optical system relative to a pattern and means for holding said carriage so positioned while fine adjustment mechanism associated with the carriage is employed for moving said optical system by small increments during the profiling operation.

It is also an object of this invention to provide readily operable magnetic or electro-magnetic brake means for an optical system and movable carriage associated with such a profile forming machine whereby undesired movement of said optical system will be prevented during operation of the machine.

It is a further object of the invention to provide means whereby the optical system associated with the pattern may be moved by small controlled increments and locked in position during subsequent movement of other parts of the optical device and operation of the profile forming machine.

It is another object of the invention to provide means including a coordinating mechanism and combined image forming means whereby both optical systems on the profile forming machine may be selectively viewed through said means.

Another object of the invention is to provide for such coordinating mechanism suitable means in the form of a shiftable prism, prism supporting means and pivotal supporting means therefor, whereby the image forming means may be rotated to various angular positions about the optical axis between said optical systems and thus to different heights and locations for the convenience of the operator of the machine.

With the foregoing and other objects in view as will become apparent from the detailed description which follows, the invention consists in the details of construction and in the arrangement and combination of parts to be hereinafter more fully set forth.

In describing the invention in detail reference will be had to the accompanying drawings forming a part of the application, wherein like characters designate corresponding parts throughout the several views and in which:

Fig. 1 shows a plan view of a pantograph and optical systems for viewing a pattern and a workpiece being profiled;

Fig. 2 is an enlarged plan view of the optical system and supporting carriage employed in Fig. 1;

Fig. 3 is an elevational sectional view taken on the line 3—3 of Fig. 2 and looking in the direction of the arrows;

Fig. 4 is a sectional view taken on line 4—4 of Fig. 3 and looking in the direction of the arrows;

Fig. 5 is a sectional view showing a portion of the structure of Fig. 3;

Fig. 6 is a sectional view taken substantially on line 6—6 of Fig. 1 and looking in the direction of the arrows;

Fig. 7 is a sectional view taken on line 7—7 of Fig. 3;

Fig. 8 shows a portion of a pattern and coordinate system associated therewith;

Fig. 9 shows a perspective view of a modified form of the invention;

Fig. 10 is a diagrammatic view showing the optical elements of Fig. 9;

Fig. 11 shows a modified use of the structure of Fig. 9; and

Fig. 12 is a partial plan view showing a modification of the structure of Fig. 9.

Referring to the drawings in detail Fig. 1 shows a pantograph generally indicated by the numeral 10 and comprising pivotally inter-connected members 12, 14, 16 and 18 arranged in the form of a parallelogram and in such a way that said pantograph may be connected by a short arm 20 of the member 14 at a fixed location 22 on a profile grinding machine or the like. The pantograph is so pivoted for allowing the free end of a long arm 24 of the member 16 to move to different positions overlying a pattern 26 and thereby move an optical system or optical head 28 pivotally carried by free end of said arm to position various portions of said pattern in optical alignment with a reticule 30 (see Fig. 7) carried by the optical system 28. This optical system may be of the type shown by Patent No. 2,389,503 issued November 20, 1945 and has the reticule 30 positioned therein at the rear focal point of the objective lens system so as to be clearly in focus when eye piece 32 is focussed for viewing the pattern.

The free end of arm 24 is pivoted with a circular end portion arranged to receive a ring portion 34 of a supporting member 36 and centrally within this member is positioned the optical system 28. The arm 24 is retained in place upon the member 36 by a collar 37 secured to ring portion 34. Member 36 is supported on a carriage 38 in such a way as to be laterally adjustable relative thereto and this adjustment is controlled by a pair of angularly disposed micrometer adjusting screws 40 and 41 threaded through an upstanding part 42 of the carriage and into engagement with the lower end 43 of the optical system or head 28. Provided to function in opposition to these screws 40 and 41 is a shoe 44 having a spring 46 bearing thereagainst and the opposite end of said spring is seated in a recessed member 48 pressed into an aperture in the carriage 38.

The carriage 38 which is in the general form of a wide flat plate is supported by a plurality of spaced casters or other suitable anti-friction means 50 arranged to roll upon an iron supporting surface 52 and always maintain the carriage and the optical system 28 carried thereby at a substantially fixed distance above this surface and thus any pattern or the like positioned thereon. A suitable manually operable brake means 54 is provided for maintaining the carriage 38 in any adjusted position upon the supporting surface 52 and may be, as shown in Fig. 3, of the magnetic type if desired. Manual means 55 is provided at the side of the carriage for operating this brake and is arranged to rotate the magnetic core 56 positioned within a non-ferrous metallic sleeve 58 so that when this core is positioned as shown in Fig. 5, the attraction between the main strongly magnetized body portion 60 and the support 52 will be negligible but when the core is rotated to the position shown in Fig. 3, so that it is adjacent a central ferrous member 62 positioned within the non-ferrous metallic collar 64 it will set up a magnetic field through member 62 strongly attracting the plate 52 and thus be effective in maintaining the carriage 38 in an adjusted position with the optical system 28 properly focused upon an exact portion of the pattern 26.

Adjustment of the optical system 28 along the pattern 26 correspondingly adjusts the position of a second optical system 66 (similar to system 28) carried by a relatively short arm 68, which is also in the form of a supporting ring, extending from the pantograph member 18 so that the reticule within this optical system may be positioned over a corresponding part of a workpiece 70 supported on a portion 72 of the profile forming machine (not shown) and when so positioned thereover a forming tool or grinding wheel, such as that indicated at 74, may be moved while under observation by the operator sighting through the eyepiece 80 of the optical system 66. Thus he may control the movement of the forming tool and advance same until the forward edge thereof reaches a position optically aligned with said reticule. A light source (not shown) may be placed beneath the tool 74 and workpiece 70 and direct a beam 75 of parallel light upwardly to silhouette the tool and workpiece as indicated in Fig. 6.

The provision of the optical systems 28 and 66 upon the long and short arms 24 and 18, respectively, of the pantograph allows the reticule 30 to be easily accurately positioned over successive portions of the pattern being copied and repositions the optical system 66 so that the tool 74 may be moved progressively into new positions beneath the reticule of the second optical system 66, thus affording an accurate means of reproducing desired profiles particularly when each repositioning is of comparatively small magnitude. The provision of the movable carriage allows easier and more exact adjustment of the first optical system 28 and the brake means thereon allows the carriage to be maintained in a fixed position after which the micrometer screws 40 and 41 may be adjusted to move the optical system 28 and thus the second optical system 66 by extremely small increments.

The movement of the system 66 is to the movement of the system 28 as the ratio of the distance from the system 66 to the point 22 is to the distance from the system 28 to the point 22. It will be obvious that various pantograph arrangements may be used with applicants' invention, if desired, such as the pantograph arrangement shown by the said Wohlfarth patent.

To aid the operator in better control and use of the profile forming machine, applicants provide a coordinate system or graph (see Fig. 8) which may be superimposed upon the pattern being copied. The coordinate system or graph is superimposed upon the pattern in such a manner that both may be simultaneously viewed through the first optical system 28. By "superimposing," as used throughout the specification and claims, we mean positioning the graph or coordinate system and the pattern for simultaneous viewing through system 28 whether the pattern and graph are formed on the same sheet of material or on different sheets positioned one over the other; such as could be the case when the pattern is formed on tracing cloth and the graph upon a separate sheet of opaque material therebeneath or even when formed upon the supporting surface 52 if desired. Or the graph could be carried upon tracing paper, tracing cloth, or other transparent or semi-transparent material and placed over the pattern. Even an opaque cut out pattern or templet of desired contour could be placed over such a coordinate system and used. Each of these arrangements will work so long as both pattern and graph are simultaneously in proper focus relative to said first optical system 28. The graph or coordinate system is formed by a plurality of closely spaced parallel lines and a plurality of closely spaced parallel lines positioned at an angle thereto, preferably at right angles, so that the intersections of either of these sets of parallel lines with the pattern provide the operator of the machine with convenient means for ascertaining small increments of distance along the pattern which he may use in estimating the amount of movement of the optical system 28 relative to the pattern he desires for each increment of travel. After aligning the reticule 30 with the pattern and each successive increment he may readjust the forming tool machine into alignment with the reticule of the second optical system 66, and thus a profile may be formed on the workpiece 70 which closely matches the shape or contour of the enlarged pattern being copied.

In order that the operator may more conveniently and easily control the forming or grinding operation of the machine, applicants also provide means in the form of a combined image forming device so that the alignment of the first optical system with the pattern and the alignment of the second optical system with the workpiece to be or being profiled may be observed by the operator without requiring that he change his position while controlling the profiling machine. As will be seen in Fig. 9, a first optical system 80, corresponding generally to the optical system 28 of Fig. 1, is carried by and pivotally attached as indicated at 83 to the long arm 83' of the pantograph and provided with a rigid guide arm 82. A second optical system 84, corresponding generally to the optical system 66 of Fig. 1, is carried by and pivotally connected as indicated at 85 to the short arm 85' of the pantograph and provided with a rigid guide arm 86. These two guide arms are connected to a tie rod 88 so that the optical axis 90 of the optical system 80 and the optical axis 92 of the optical system 84 will always be maintained in optical alignment. Since the distance between the systems 80 and 84 must vary during use of the pantograph, the arm 86 is pin-connected, as indicated at 94, to the tie rod 88 while the opposite end of the tie rod is arranged to have a sliding connection at 95 with arm 82.

Between and in optical alignment with the optical systems 80 and 84 is a prism supporting means 96, preferably in the form of a substantially enclosed elongated box adapted to house a roof prism or roof prism cluster 98 (see Fig. 10) in such a manner that light entering optical systems 80 and 84 and being reflected by penta-prisms 99 and 100 positioned within systems 80 and 84, respectively, will strike the prism or prism cluster 98 and be reflected upwardly therefrom for viewing through an image forming device 101 containing an eyepiece 102 carried at the upper end of a column 104 attached to the box 96. The box 96 is preferably positioned closely adjacent the optical system 84 and secured in a suitable fixed relation relative thereto, such as in the present instance by a pin connection at 106 between a rigid arm 108 extending from box 96 and tie rod 88.

Within box 96 is slidably carried the prism cluster 98 so that movement of a control arm 110 extending outwardlly through a slot 112 in said box may be used by the operator for moving said cluster 98 toward the optical system 80 or optical system 84, as the case may be, to position the reflecting surfaces 113 or 116 in optical alignment with the eyepiece 102. Thus, it will be obvious that by a slight movement of the handle 110, the operator sighting through eyepiece 102 may easily and quickly selectively view either the pattern or the workpiece. A preferred combined optical system for this image forming device of Fig. 9 is clearly shown in Fig. 10 and comprises together with the prisms 98, 99 and 100 and the eyepiece 102, forward objective lens systems 114 and 115 within the parts 80 and 84, respectively, and a rear objective lens 117 which is arranged to receive parallel light from lenses 114 and 115 and focus same on a reticule 118, and upon which the eyepiece 102 is likewise focused. It will be noted that the optical path of the light from the workpiece to the reticule 118 remains constant during all profile grinding operations. While the optical distance or path from the pattern to the reticule 118 is usually varied during use of the pantograph, this does not affect the focusing of the pattern at the plane of the reticule since the lens 117 is a rear telescope objective type lens and since optics of the two optical systems 80 and 84 are infinitely corrected.

If desired, a viewing screen 120, such as a sheet of ground glass or the like, may be provided to function with the combined viewing system so that an operator may see images of the pattern or the workpiece thereon, such being accomplished by the positioning of a front surface mirror 122 above and in axial alignment with the tube 104 and so angularly disposed as to direct the image upon said viewing screen. In such cases it may be desirous to provide additional illumination for the pattern or the workpiece in order that the image will be clearly shown upon the screen.

Since it may be desired by the operator of the machine to view the workpiece or pattern vertically or horizontally or at any intermediate position, we have provided in Fig. 12 a modified construction, more or less diagrammatically shown, wherein the prism box 96 may be provided with suitable hollow bearings 124 at opposite ends thereof arranged to extend through openings in a supporting member 126 rigidly secured to supporting arm 108' which is in turn fixedly connected to tie rod 88. The bearings 124 allow the box 96, tube 104 and eyepiece 102 to be rotated about the common optical axis 90—92 so that the eyepiece may be used for viewing the pattern or workpiece regardless of the angular position at which it is disposed during use relative to the profile forming machine.

From the foregoing, it will be seen that we have provided simple, efficient and economical means for obtaining all of the objects and advantages of the invention.

Having described our invention, we claim:

1. In a profile forming machine of the character described, a pantograph pivotally connected at a fixed location relative to said machine, said pantograph comprising a plurality of pivotally connected members forming a parallelogram and having a relatively long rigid arm and a relatively short rigid arm extending therefrom, a first optical system including a reticule carried by said long arm for viewing an enlarged pattern positioned on a magnetic supporting surface at a fixed location relative to said machine, a movable carriage engaging and supporting said long arm and first optical system in spaced relation to said supporting surface, anti-friction means secured to said carriage and located between said carriage and surface for allowing free movement of said carriage in all directions parallel to said supporting surface, manually operable magnetic brake means carried by said carriage and positioned adjacent said supporting surface for releasably securing said carriage in any adjusted position thereof on said supporting surface, and a second optical system including a reticule carried by said short arm for viewing a workpiece on said machine and arranged to be profiled thereby.

2. In a profile forming machine of the character described, a pantograph pivotally connected at a fixed location relative to said machine, said pantograph comprising a plurality of pivotally connected members forming a parallelogram and having a relatively long rigid arm and a relatively short rigid arm extending therefrom, a first optical system including a reticule carried by said long arm for viewing an enlarged pattern positioned on a supporting surface at a fixed location relative to said machine, a movable carriage engaging and supporting said long arm and first optical system in spaced relation to said supporting surface, anti-friction means between said carriage and surface for allowing movement of said carriage in all directions parallel to said supporting surface, manually operable brake means between said carriage and supporting surface for releasably securing said carriage in any adjusted position on said supporting surface, fine adjustment means supported by said carriage and operably associated with said first optical system and long arm for producing small increments of movement of said first optical system relative to said carriage when secured relative to said supporting surface, and a second optical system including a reticule carried by said short arm for viewing a workpiece on said machine and arranged to be profiled thereby.

3. In a profile forming machine of the character described, a pantograph pivotally connected at a fixed location relative to said machine, said pantograph comprising a plurality of pivotally connected members forming a parallelogram and having a relatively long rigid arm and a relatively short rigid arm extending therefrom, a first optical system including a reticule carried by said long arm for viewing an enlarged pattern positioned on a supporting surface at a fixed location relative to said machine, a movable carriage engaging and supporting said long arm and first optical system in spaced relation to said supporting surface, anti-friction means between said carriage and surface for allowing movement of said carriage in all directions parallel to said supporting surface, fine adjustment means supported by said carriage and operably associated with said first optical system and long arm for producing small increments of movement of said first optical system and long arm relative to said carriage in any desired direction parallel to said support, and a second optical system including a reticule carried by said short arm for viewing a workpiece on said machine and arranged to be profiled thereby.

4. In a profile forming machine of the character described, a pantograph pivotally connected at a fixed location relative to said machine, said pantograph comprising a plurality of pivotally connected members forming a parallelogram and having a relatively long rigid arm and a relatively short rigid arm extending therefrom, a first optical system including a reticule carried by said long arm for viewing an enlarged pattern positioned on a supporting surface of ferrous material at a fixed location relative to said machine, a movable carriage engaging and supporting said long arm and first optical system in spaced relation to said supporting surface, anti-friction means between said carriage and surface for allowing movement of said carriage in all directions parallel to said supporting surface, manually operable brake means between said carriage and supporting surface for releasably securing said carriage in any adjusted position on said supporting surface, fine adjustment means supported by said carriage and operably associated with said first optical system and long arm for producing small increments of movement of said first optical system relative to said carriage, said brake means comprising a magnetic brake element positioned in a closely spaced relation to said supporting surface, and a second optical system including a reticule carried by said short arm for viewing a workpiece on said machine and arranged to be profiled thereby.

5. In a profile forming machine of the character described, a pantograph pivotally connected at a fixed location relative to said machine, said pantograph comprising a plurality of pivotally connected members forming a parallelogram and having a relatively long rigid arm and a relatively short rigid arm extending therefrom, a first optical system including a reticule carried by said long arm for viewing an enlarged pattern positioned on a supporting surface at a fixed location relative to said machine, a second optical system including a reticule carried by said short arm for viewing a workpiece on said machine and arranged to be profiled thereby, each optical system being pivotally attached to its respective arm and provided with a guide arm, a tie rod fixedly secured to one of said guide arms and slidably engaging the other of said guide arms for maintaining said optical systems in a predetermined alignment relative to each other, a prism supporting member positioned intermediate said optical systems and arranged at a fixed distance relative to one of said systems, prism means carried by said prism supporting member and arranged to be moved alternatively axially toward and away from each of said optical systems, and image forming means associated with said prism means, said prism means being movable to optically align either of said optical systems with said image forming means.

6. In a profile forming machine of the character described, a pantograph pivotally connected at a fixed location relative to said machine, said pantograph comprising a plurality of pivotally connected members forming a parallelogram and having a relatively long rigid arm and a relatively short rigid arm extending therefrom, a first optical system including a reticule carried by said long arm for viewing an enlarged pattern positioned on a supporting surface at a fixed location relative to said machine, a second optical system including a reticule carried by said short arm for viewing a workpiece on said machine and arranged to be profiled thereby, each optical system being pivotally attached to its respective arm and provided with a guide arm, a tie rod fixedly secured to one of said guide arms and slidably engaging the other of said guide arms for maintaining said optical systems in a predetermined alignment relative to each other, a prism supporting member positioned between said optical systems, a bracket for said supporting member maintained by connecting means at a fixed distance relative to one of said systems, prism means carried by said prism supporting member and arranged to be moved alternatively axially toward and away from each of said optical systems, and image forming means associated with said prism means, said prism means being movable to optically align either of said optical systems with said image forming means, said image forming means, prism supporting means and prism means being pivotally mounted upon said bracket for movement about the optical axis extending between said optical systems, whereby said image forming means may be rotated to different angular positions relative to said machine as desired by the operator thereof.

7. In a profile forming machine of the character described, a pantograph pivotally connected at a fixed location relative to said machine, said pantograph comprising a plurality of pivotally connected members forming a parallelogram and having a relatively long rigid arm and a relatively short rigid arm extending therefrom, a first optical system including a reticule carried by said long arm for viewing an enlarged pattern positioned on a supporting surface at a fixed location relative to said machine, a second optical system including a reticule carried by said short arm for viewing a workpiece on said machine and arranged to be profiled thereby, each optical system being pivotally attached to its respective arm and provided with a guide arm, a tie rod fixedly secured to one of said guide arms and slidably engaging the other of said guide arms for maintaining said optical systems in a predetermined alignment relative to each other, a prism supporting member positioned between said optical systems and arranged at a fixed distance relative to one of said systems, prism means carried by said prism supporting member and arranged to be moved alternatively axially toward and away from each of said optical systems, image forming means associated with said prism means, said prism means being movable to optically align either of said optical systems with said image forming means, a movable carriage engaging and supporting said long arm and first optical system in spaced relation to said supporting surface, and anti-friction means between said carriage and supporting surface.

8. In a profile forming machine of the character described, a pantograph pivotally connected at a fixed location relative to said machine, said pantograph comprising a plurality of pivotally connected members forming a parallelogram and having a relatively long rigid arm and a relatively short rigid arm extending therefrom, a first optical system including a reticule carried by said long arm for viewing an enlarged pattern positioned on a supporting surface at a fixed location relative to said machine, a second optical system including a reticule carried by said short arm for viewing a workpiece on said machine and arranged to be profiled thereby, each optical system being pivotally attached to its respective arm and provided with a guide arm, a tie rod fixedly secured to one of said guide arms and slidably engaging the other of said guide arms for maintaining said optical systems in a predetermined alignment relative to each other, a prism supporting member positioned between said optical systems and arranged at a fixed distance relative to one of said systems, prism means carried by said prism supporting member and arranged to be moved alternatively axially toward and away from each of said optical systems, image forming means associated with said prism means, said prism means being movable to optically align either of said optical systems with said image forming means, a movable carriage engaging and supporting said long arm and first optical system in spaced relation to said supporting surface, anti-friction means between said carriage and supporting surface, and manually operable brake means between said carriage and supporting surface for releasably securing said carriage against movement relative thereto.

9. In a profile forming machine of the character described, a pantograph pivotally connected at a fixed location relative to said machine, said pantograph comprising a plurality of pivotally connected members forming a parallelogram and having a relatively long rigid arm and a relatively short rigid arm extending therefrom, a first optical system including a reticule carried by said long arm for viewing an enlarged pattern positioned on a supporting surface at a fixed location relative to said machine, a second optical system including a reticule carried by said short arm for viewing a workpiece on said machine and arranged to be profiled thereby, each optical system being pivotally attached to its respective arm and provided with a guide arm, a tie rod fixedly secured to one of said guide arms and slidably engaging the other of said guide arms for maintaining said optical systems in a predetermined alignment relative to each other, a prism supporting member positioned between said optical systems, a bracket for said supporting member maintained by connecting means at a fixed distance relative to one of said systems, prism means carried by said prism supporting member and arranged to be moved alternatively axially toward and away from each of said optical systems, image forming means associated with said prism means, said prism means being movable to optically align either of said optical systems with said image forming means, said image forming means, prism supporting means and prism means being pivotally ounted upon said bracket for movement about the optical axis extending between said optical systems, whereby said image forming means may be rotated to different angular positions relative to said machine as desired by the operator thereof, a movable carriage engaging and supporting said long arm and first optical system in spaced relation to said supporting surface, anti-friction means between said carriage and supporting surface, manually operable brake means between said carriage and supporting surface for releasably securing said carriage against movement relative thereto, and fine adjustment means supported by said carriage and operably associated with said first optical system and long arm for producing small increments of movement of said first optical system relative to said carriage.

10. In a profile forming machine of the character described, a pantograph pivotally connected at a fixed location relative to said machine, said pantograph comprising a plurality of pivotally connected members forming a parallelogram and having a relatively long rigid arm and a relatively short rigid arm extending therefrom, a first optical system including a reticule carried by said long arm for viewing an enlarged pattern positioned on a supporting surface at a fixed location relative to said machine, a second optical system including a reticule carried by said short arm for viewing a workpiece on said machine and arranged to be profiled thereby, each optical system being pivotally attached to its respective arm and provided with a guide arm, a tie rod fixedly secured to one of said guide arms and slidably engaging the other of said guide arms for maintaining said optical systems in a predetermined alignment relative to each other, a prism supporting member positioned between said optical systems and arranged at a fixed distance relative to one of said systems, prism means carried by said prism supporting member and arranged to be moved alternatively axially toward and away from each of said optical systems, image forming means associated with said prism means, said prism means being movable to optically align either of said optical systems with said image forming means, a movable carriage engaging and supporting said long arm and first optical system in spaced relation to said supporting surface, anti-friction means between said carriage and supporting surface, and fine adjustment means supported by said carriage and operably associated with said first optical system and long arm for producing small increments of movement of said first optical system relative to said carriage.

11. In a profile forming machine of the character described, a pantograph pivotally connected at a fixed location relative to said machine, said pantograph comprising a plurality of pivotally connected members forming a parallelogram and having a relatively long rigid arm and a relatively short rigid arm extending therefrom, a first optical system including a reticule carried by said long arm for viewing an enlarged pattern positioned on a supporting surface at a fixed location relative to said machine, a second optical system including a reticule carried by said short arm for viewing a workpiece on said machine and arranged to be profiled thereby, each optical system being pivotally attached to its respective arm and provided with a guide arm, a tie rod fixedly secured to one of said guide arms and slidably engaging the other of said guide arms for maintaining said optical systems in a predetermined alignment relative to each other, a prism supporting member positioned intermediate said optical systems and arranged at a fixed distance relative to one of said systems, prism means carried by said prism supporting member and arranged to be moved alternatively axially toward and away from each of said optical systems, image forming means associated with said prism means, said prism means being movable to optically align either of said optical systems with said image forming means, a movable carriage engaging and supporting said long arm and first optical system in spaced relation to said supporting surface, manually operable brake means between said carriage and supporting surface for releasably securing said carriage against movement relative thereto, and fine adjustment means supported by said carriage and operably associated with said first optical system and long arm for producing small increments of movement of said first optical system relative to said carriage.

12. In a profile forming machine of the character described, a pantograph pivotally connected at a fixed location relative to said machine, said pantograph comprising a plurality of pivotally connected members forming a parallelogram and having a relatively long rigid arm and a relatively short rigid arm extending therefrom, a first optical system including a reticule carried by said long arm for viewing an enlarged pattern positioned on a supporting surface of ferrous material at a fixed location relative to said machine, a second optical system including a reticule carried by said short arm for viewing a workpiece on said machine and arranged to be profiled thereby, each optical system being pivotally attached to its respective arm and provided with a guide arm, a tie rod fixedly secured to one of said guide arms and slidably engaging the other of said guide arms for maintaining said optical systems in a predetermined alignment relative to each other, a prism supporting member positioned intermediate said optical systems and arranged at a fixed distance relative to one of said systems, prism means carried by said prism supporting member and arranged to be moved alternatively axially toward and away from each of said optical systems, image forming means associated with said prism means, said prism means being movable to optically align either of said optical systems with said image forming means, a movable carriage engaging and supporting said long arm and first optical system in spaced relation to said supporting surface, manually operable brake means between said carriage and supporting surface for releasably securing said carriage against movement relative thereto, fine adjustment means supported by said carriage and operably associated with said first optical system and long arm for producing small increments of movement of said first optical system relative to said carriage, said brake means comprising a magnetic element positioned in closely spaced relation relative to said supporting surface, and manually operable means for rotating said element.

13. In a profile forming machine of the character described, a pantograph pivotally connected at a fixed location relative to said machine, said pantograph comprising a plurality of pivotally connected members forming a parallelogram and having a relatively long rigid arm and a relatively short rigid arm extending therefrom, a first microscope system including a reticule carried by said long arm for viewing an enlarged pattern positioned upon a supporting surface at a fixed location relative to said machine, a second microscope system including a reticle carried by said short arm for viewing a workpiece on said machine and arranged to be profiled thereby, each of said microscope systems being pivotally attached to its respective arm and provided with a guide arm extending outwardly therefrom, a tie rod in fixed relation to one of said guide arms and slidably engaging the other of said guide arms for maintaining said microscope systems in a predetermined alignment relative to each other, a supporting member positioned in fixed relation intermediate said microscope systems, image forming means carried by said supporting member, and reflecting means adjacent thereto and also carried by said supporting member and arranged to be moved so as to alternatively reflect light rays from either of said microscope systems toward said image forming means.

DAVID D. LOWBER.
GUSTAV E. GUELLICH.

REFERENCES CITED

The following references are of record in the file of this patent:

UNITED STATES PATENTS

| Number | Name | Date |
|---|---|---|
| 790,172 | Benton | May 16, 1905 |
| 1,811,940 | Kappler | June 30, 1931 |
| 2,164,169 | Wohlfarth | June 27, 1939 |
| 2,179,388 | Taylor et al. | Nov. 7, 1939 |
| 2,206,587 | Taylor | July 2, 1940 |
| 2,234,539 | Cooke | Mar. 11, 1941 |
| 2,338,729 | McQuaid | Jan. 11, 1944 |
| 2,389,503 | Guellich | Nov. 20, 1945 |

FOREIGN PATENTS

| Number | Country | Date |
|---|---|---|
| 614,088 | Germany | June 1, 1935 |